(12) United States Patent
Ito et al.

(10) Patent No.: US 8,209,292 B2
(45) Date of Patent: Jun. 26, 2012

(54) HIERARCHICAL MANAGEMENT STORAGE SYSTEM AND STORAGE SYSTEM OPERATING METHOD

(75) Inventors: Akira Ito, Yokohama (JP); Nobumitsu Takaoka, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 12/575,937

(22) Filed: Oct. 8, 2009

(65) Prior Publication Data

US 2011/0040729 A1 Feb. 17, 2011

(30) Foreign Application Priority Data

Aug. 12, 2009 (JP) ................. 2009-186962

(51) Int. Cl.
*G06F 7/00* (2006.01)
*G06F 17/00* (2006.01)

(52) U.S. Cl. ...................................... 707/654

(58) Field of Classification Search .................. 707/654, 707/999.204
See application file for complete search history.

(56) References Cited

U.S. PATENT DOCUMENTS

| | | | |
|---|---|---|---|
| 6,023,709 A | 2/2000 | Anglin et al. | |
| 7,225,211 B1 | 5/2007 | Colgrove et al. | |
| 2005/0021566 A1 | 1/2005 | Mu | |
| 2006/0200508 A1* | 9/2006 | Telkowski et al. | 707/204 |
| 2007/0179990 A1* | 8/2007 | Zimran et al. | 707/201 |
| 2007/0198612 A1* | 8/2007 | Prahlad et al. | 707/204 |
| 2008/0010325 A1* | 1/2008 | Yamakawa | 707/204 |
| 2008/0183774 A1* | 7/2008 | Otani et al. | 707/204 |
| 2009/0249005 A1* | 10/2009 | Bender et al. | 711/162 |
| 2010/0250508 A1* | 9/2010 | Erofeev | 707/704 |

* cited by examiner

*Primary Examiner* — Kimberly Wilson
(74) *Attorney, Agent, or Firm* — Foley & Lardner LLP

(57) ABSTRACT

The storage system eliminates inconsistency between a stub, and a file data storage location indicated by the stub. In a storage system that executes HSM using stubs, information relating to a higher tier, which is a data migration source, is recorded during data migration. The stub in the higher tier is correctly restored using the higher-tier information thus recorded. The stub is restored, and inconsistency between information in the HSM layers is resolved.

10 Claims, 18 Drawing Sheets

| | | |
|---|---|---|
| T16201 | CREATION DATE AND TIME | 2009/05/01 23:00 |
| T16202 | UPDATE DATE AND TIME | 2009/05/13 12:35 |
| T16203 | LAST ACCESS DATE AND TIME | 2009/05/21 21:12 |
| T16204 | SIZE | 35.3 MB |
| | ⋮ | ⋮ |
| T16205 | STUB FLAG | TRUE |

| | | |
|---|---|---|
| T16301 | TCREATION DATE AND TIME | 2009/05/01 23:00 |
| T16302 | UPDATE DATE AND TIME | 2009/05/13 12:35 |
| T16303 | LAST ACCESS DATE AND TIME | 2009/05/21 21:12 |
| T16304 | SIZE | 35.3 MB |
| | ⋮ | ⋮ |
| T16305 | MIGRATION ID | 102319518598 |
| T16306 | MIGRATION DATE AND TIME | 2009/05/18 2:30 |
| T16307 | MIGRATION TARGET | nas2.example.com |
| T16308 | MIGRATION-TARGET STORAGE LOCATION | /migration/data/foo/bar/dir1 |

| | | |
|---|---|---|
| T26201 | CREATION DATE AND TIME | 2009/05/01 23:00 |
| T26202 | UPDATE DATE AND TIME | 2009/05/13 12:35 |
| T26203 | LAST ACCESS DATE AND TIME | 2009/05/21 21:12 |
| T26204 | SIZE | 35.3MB |
| | ⋮ | ⋮ |
| T26205 | MIGRATION ID | 102319518598 |
| T26206 | MIGRATION DATE AND TIME | 2009/05/18 2:30 |
| T26207 | MIGRATION SOURCE | nas1.example.com |
| T26208 | MIGRATION-SOURCE STORAGE LOCATION | /foo/bar/dir1 |

| FILE NAME | MIGRATION ID | MIGRATION SOURCE | MIGRATION-SOURCE STORAGE LOCATION | DELETION DATE AND TIME |
|---|---|---|---|---|
| file_1 | 4290215094613 | nas1.example.com | /hoge/foo/dir1 | 2009/05/19 23:00 |
| file_2 | 2490951035925 | nas1.example.com | /bar/dir2 | 2009/05/12 23:00 |
| ... | ... | ... | ... | ... |
| file_n | 1893482039377 | nas1.example.com | /fuga/···/dir3 | 2009/01/01 23:00 |

T26301 T26302 T26303 T26304 T26305

HIERARCHICAL MANAGEMENT STORAGE SYSTEM AND STORAGE SYSTEM OPERATING METHOD

CROSS-REFERENCE TO RELATED APPLICATIONS

This application relates to and claims priority from Japanese Patent Application No. 2009-186962 filed on Aug. 12, 2009, the entire disclosure of which is incorporated herein by reference.

BACKGROUND OF THE INVENTION

1. Field of the Invention

The present invention relates to a storage system and a storage system management method, and more particularly to a technique whereby, in a storage system that executes hierarchical storage management using stubs, an information inconsistency, between a stub and a file indicated by the stub between layers of a storage apparatus, is efficiently resolved, and whereby the storage system is suitably operated.

2. Description of the Related Art

One method of efficiently utilizing the capacity of a storage system is Hierarchical Storage Management (HSM) in a patent document No. U.S. Pat. No. 7,225,211 B1. An HSM system typically comprises two or more storage apparatuses, namely, a high-speed, low-capacity storage apparatus and a low-speed, high-capacity storage apparatus, which exist in a hierarchical relationship. Each layer in the hierarchy is called a 'tier'. Furthermore, the high-speed, low-capacity storage layer is called a 'higher tier', while the low-speed, high-capacity storage layer is called a 'lower tier'. In HSM, data is first stored in the higher tier, and data with a low usage frequency is moved (migrated) to the lower tier, thus making efficient use of storage capacity.

Stubs are often used to allow the data moved to the lower tier to be referred to easily. Stubs are disposed in the higher tier and indicate storage locations in the lower tier to which the data has been moved. A user is able to refer to the data moved to the lower tier by referring to the stub in the higher tier. In an HSM that uses such stubs, information inconsistency between stubs that exist in the higher tier and the data of files and so on present in the lower tier indicated by the stubs are sometimes a problem. Here, a mismatch refers to a case where a stub in the higher tier does not indicate a suitable lower tier file, or a case where a stub that should indicate a lower tier file does not exist in the higher tier.

Another patent document U.S. Pat. No. 6,023,709 B1 discloses a technique whereby, when receiving access that requires a stub to be referenced, a higher-tier storage apparatus notifies an access source of an error when a stub mismatch is detected, and then executes error repair.

The mismatch mentioned above may often arise in cases where a restore from backup data in the higher tier is executed or where a file is deleted in the lower tier, for example.

In a method disclosed in patent document U.S. Pat. No. 6,023,709 B1, an error in data indicated by a stub is detected and repaired at the point where a user accesses the stub. This method therefore fails to address a case where the stub itself is lost. Moreover, since the method described in the above patent document does not allow an inconsistency to be dealt with until the user performs access, this is an inconvenience to the user.

SUMMARY OF THE INVENTION

An object of the present invention is to provide a storage system capable of rapidly detecting and repairing an inconsistency generated upon data recovery or another event, and to a storage system operating method.

The storage system of the present invention comprises a first storage apparatus coupled to a client computer, and a second storage apparatus coupled to the first storage apparatus.

The first storage apparatus includes a first storage area storing a plurality of file data that are access targets of the client computer, and a second storage area storing backup data of the file data. The second storage apparatus is coupled to the first storage apparatus, and includes a third storage area storing the file data migrated from the first storage area.

When backup of the plurality of file data from the first storage area to the second storage area is executed, a first time at which the backup data is created is managed, and, when file data included in the plurality of file data is migrated from the first storage area to the third storage area, a second time at which the file data is migrated is managed for each of the file data.

When data of the first storage area is recovered using the backup data of the second storage area, file data for which the second time is newer than the first time is extracted from the plurality of file data stored in the third area. A stub indicating a storage target in the third storage area of the extracted file data is then restored and stored in the first storage area.

Furthermore, problems disclosed by the present application and a method of solving these problems will become more apparent from the Description of the Specific Embodiments section, and from the drawings.

BRIEF DESCRIPTION OF THE DRAWINGS

FIG. 4 shows metadata of a file in the NAS apparatus (A);

FIG. 5 shows information of a stub of the NAS apparatus (A);

FIG. 6 shows metadata of a file of the NAS apparatus (B);

FIG. 7 shows a deleted file table;

DESCRIPTION OF THE SPECIFIC EMBODIMENTS

An embodiment of the present invention will be described hereinbelow with reference to the drawings.

Figure 1:
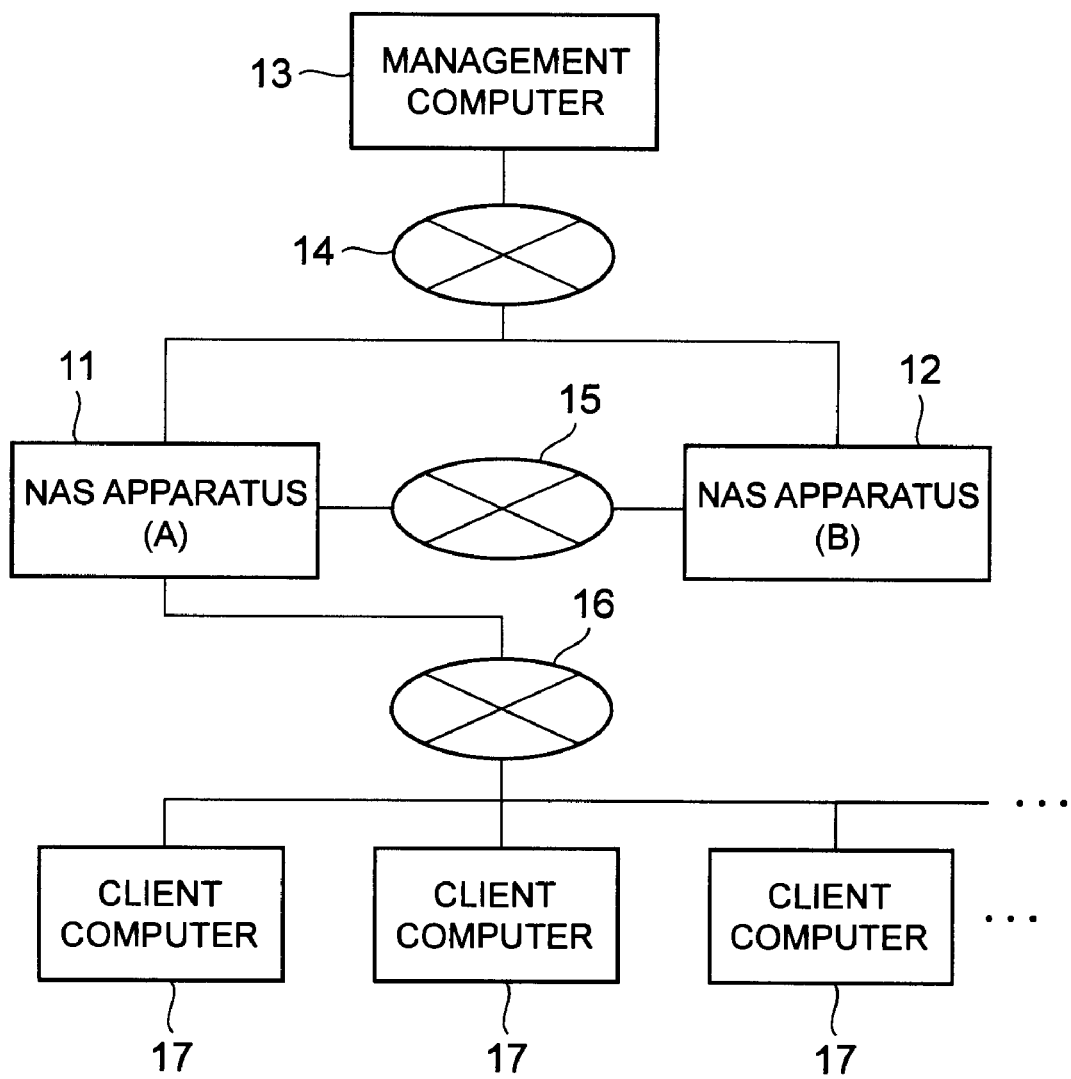
FIG. 1 shows the composition of a storage system according to the present invention.

FIG. 1 illustrates the composition of a system of the present invention. A NAS (Network Attached Storage) apparatus (A) 11 and a NAS apparatus B (12) are coupled to each other via a migration LAN 15. Furthermore, a management computer 13 is coupled to the NAS apparatus (A) 11 and the NAS apparatus (B) 12 via a management LAN 14. A client computer 17 is coupled to the NAS apparatus (A) 11 via a user LAN 16.

Figure 2:
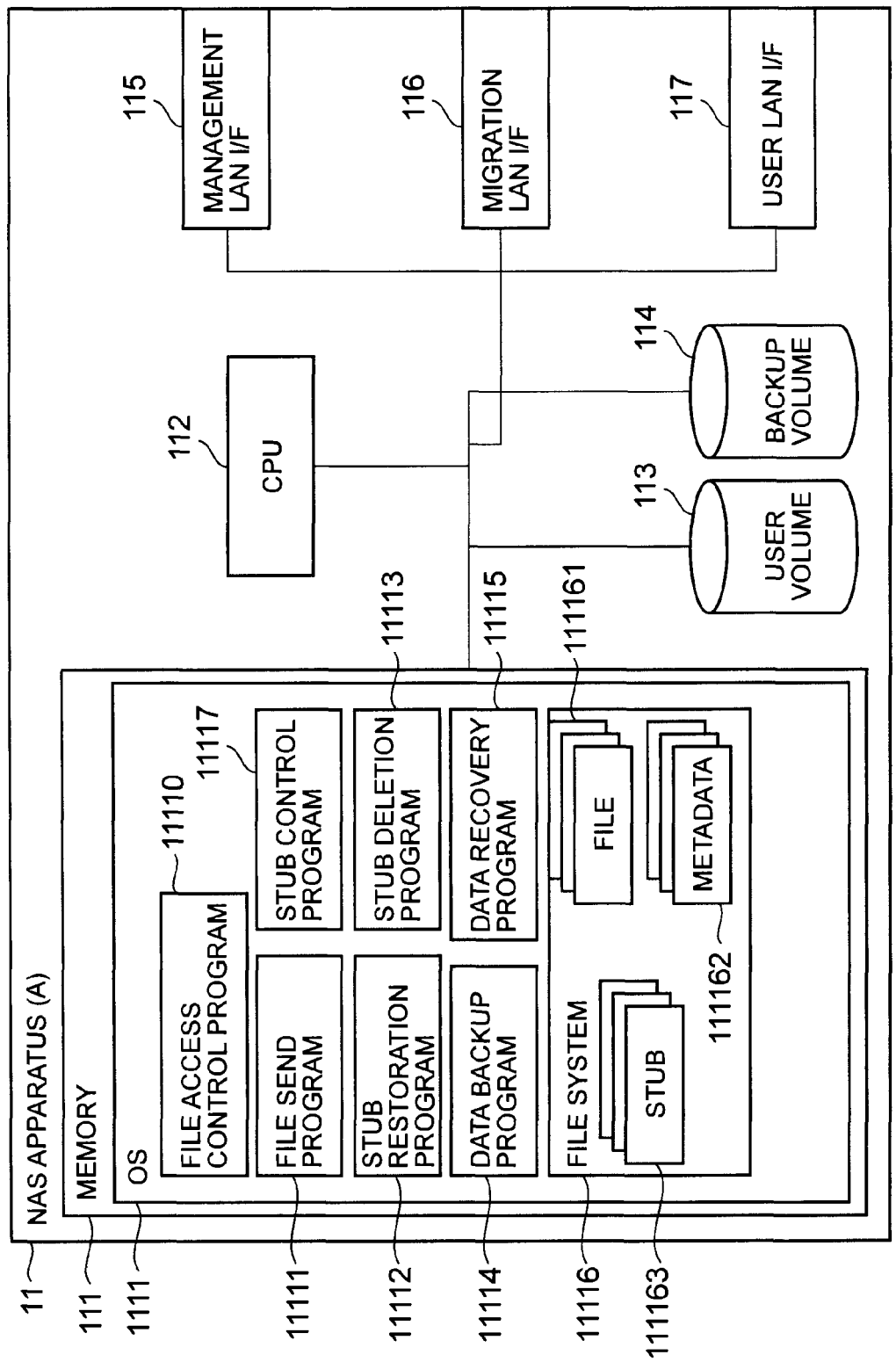
FIG. 2 shows the composition of a NAS apparatus (A)

FIG. 2 illustrates the composition of the NAS apparatus (A) 11. The NAS apparatus (A) 11 comprises a memory 111 storing programs during program execution, a CPU 112 performing program processing, a user volume 113 with which a client user of the NAS apparatus stores data, a backup volume 114 storing backup data of the user volume, a management I/F 115 for coupling to the management computer 13 via the management LAN 14, a migration I/F 116 for coupling to the NAS apparatus (B) 12 via the migration LAN 15, and a user I/F 117 for coupling to the client computer 17 via the user LAN 16. The user volume 113 and the backup volume 114 are storage areas that the NAS apparatus (A) supplies to the client computer 17. The user volume 113 and the backup volume 114 may be provided in the NAS apparatus (A) 11, or may be supplied to the NAS apparatus (A) 11 by a disk drive or flash memory in a storage apparatus coupled to the NAS apparatus, for example. The management LAN 14, the migration LAN 15, and the user LAN 16 may be formed as a single LAN. Similarly also for the I/F coupled to the LAN, the management I/F 115, the migration I/F 116, and the user I/F 117 may also be formed as a single I/F. The CPU 11 and the volumes 114 and 115 may be coupled by a bus interface such as a PCI (Peripheral Component Interconnect), or may be coupled by a Fiber Channel SAN.

An OS 1111 is stored in the memory 111.

Programs that are operated by the OS 1111, namely, a file access control program 11110, a file send program 11111, a stub restoration program 11112, a stub deletion program 11113, a data backup program 11114, a data recovery program 11115, a file system 11116, and a stub control program 11117, and a deleted file table (not shown in FIG. 2), are held in the memory 111. The programs are executed by the CPU 112.

The file access control program 11110 opens a target file for a user in accordance with a file access request from the user. If the target file is migrated, the migrated file is accessed via a stub.

The file send program 11111 includes a function to send a file 111161 conforming to a preset condition to the NAS apparatus (B) 12 via the migration I/F 116 in accordance with a user instruction or preset schedule, delete the file once sending is complete, and create a stub 111163 in place of the file.

The stub restoration program 11112 includes a function to create a stub 111163 that corresponds to the file, on the basis of metadata information of the file received from the NAS apparatus (B) 12.

The stub deletion program 11113 includes a function to delete the stub 111163 corresponding to the deleted file, on the basis of deleted file information received from the NAS apparatus (B) 12.

The data backup program 11114 has a function to create backup data of the user volume 113 in the backup volume 114 in accordance with an instruction or a preset schedule from the user.

The data recovery program 11115 includes a function to execute a recovery of the user volume 113 by using backup data stored in the backup volume 114 in accordance with an instruction from the user.

A plurality of files 111161, metadata 111162 for each file, and the stub 111163, which is a special file indicating the location of a file migrated to the NAS apparatus (B) 12, are managed by the file system 11116, and the actual states of these data are held in the user volume 113.

When the user accesses the stub 111163, the stub control program 11117 acquires a file 121161 that is in the NAS apparatus (B) 12 and indicated by the stub. The user is accordingly able to access the file 121161, which has been migrated from the NAS apparatus (A) 11 to the NAS apparatus (B) 12, via the stub 111163.

Figure 3:
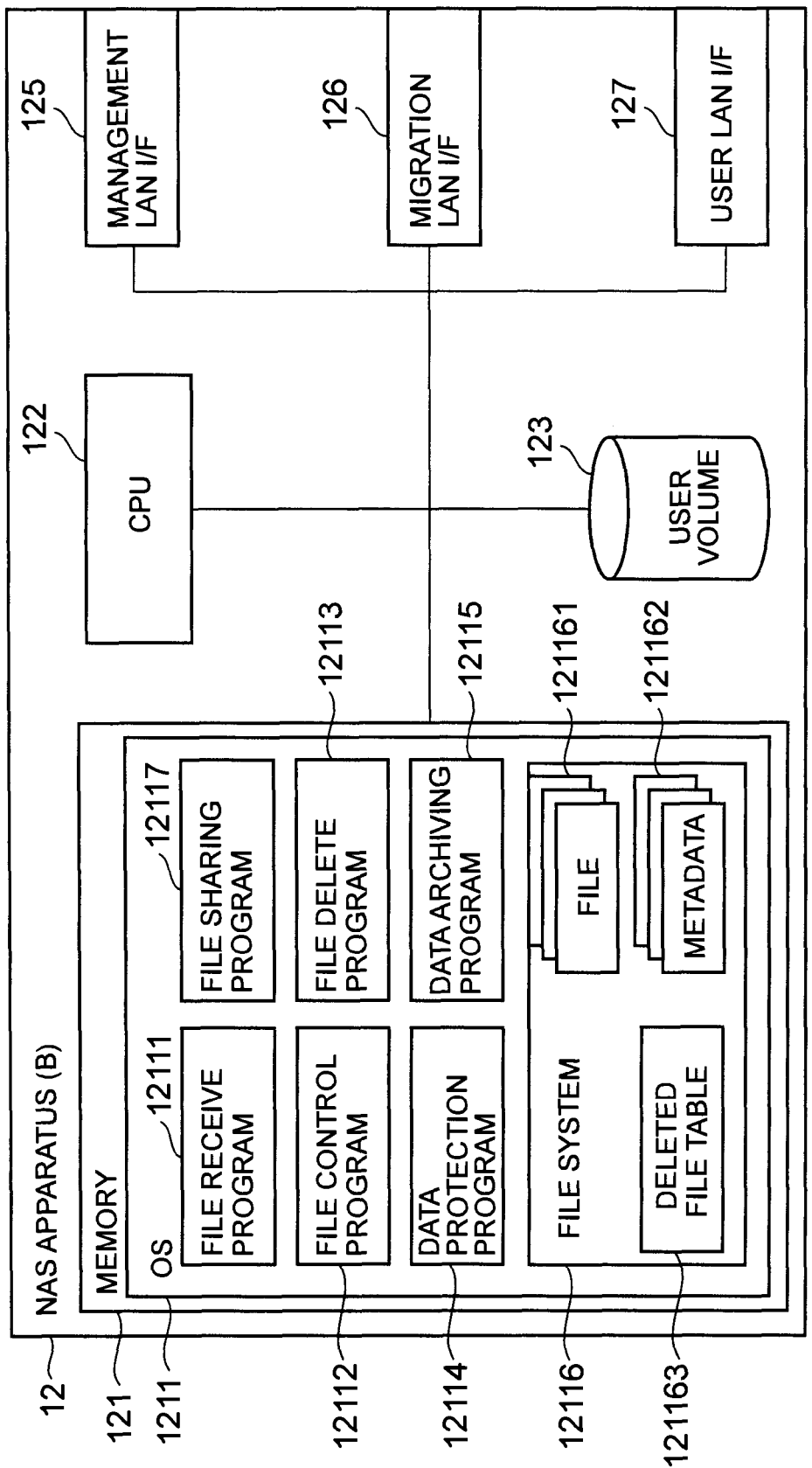
FIG. 3 shows the composition of a NAS apparatus (B)

FIG. 3 shows the composition of the NAS apparatus (B) 12. The NAS apparatus (B) 12 comprises a memory 121 which stores programs during execution, a CPU 122 which performs program processing, a user volume 123 with which the client user of the NAS apparatus stores data, a management I/F 125 for coupling to the management computer 13 via the management LAN 14, a migration I/F 126 for coupling via the NAS apparatus (A) 11 and the migration LAN 15, and a user I/F 127 for coupling to the client computer 17 via the user LAN 16. The management LAN 14, the migration LAN 15, and the user LAN 16 may also be formed as a single LAN. Similarly also for the I/F coupled to the LAN, the management I/F 125, the migration I/F 126, and the user I/F 127 may be formed as a single I/F. The CPU 12, and the volumes 124 and 125 may also be coupled via a PCI or other bus interface, or may be coupled via a Fiber Channel SAN.

An OS 1211 is held in the memory 121.

Programs which are operated by the OS 1211, namely, a file receive program 12111, a file control program 12112, a file deletion program 12113, a data protection program 12114, a data archiving program 12115, a file system 12116, and a file sharing program 12117, are held in the memory 121. The programs are executed by the CPU 122.

The file receive program 12111 receives a file, which is sent by the file send program 11111 of the NAS apparatus (A) 11 when migration is executed, via the migration I/F 126, and stores the file in the file system 12116. The file control program 12112 sends required file metadata to the NAS apparatus (A) 11 when the NAS apparatus (A) 11 restores the stub.

The file deletion program 12113 instructs the stub deletion program 11113 of NAS apparatus (A) 11 to delete the stub when deleting the file 121161, and records information on the deleted file in a deleted file table 121163. Furthermore, the file deletion program 12113 sends information recorded in the deleted file table 121163 to the NAS apparatus (A) 11 when deleting a stub caused by an inconsistency in the NAS apparatus (A) 11.

Data protection program 12114 protects the data using a data-mirroring device or other such device in order to prevent loss of data of the NAS apparatus (B) 12, which is an archival storage apparatus.

Data archiving program 12115 prevents writing and deletion of data in order to protect all the data of the NAS apparatus (B) 12, serving as an archival storage apparatus, over long periods. A plurality of files 121161, metadata 121162 for each file, and the deleted file table 121163 are held in the file system 12116.

The file sharing program 12117 sends files requested by the stub control program 11117 of the NAS apparatus (A) 11 to the NAS apparatus (A) 11.

FIG. 4 shows an example of the metadata 111162 held by the file system 11116 of the NAS apparatus (A) 11. The metadata are held for each file 111161 held by the file system 11116. The metadata of 111162 holds at least a stub flag T16205 to discriminate whether the file is a stub, in addition to file-related information such as a file creation date and time T16201, an update date and time T16202, a last access date and time T16203, and a size T16204.

FIG. 5 shows an example of information held by the stub 111163 held by the file system 11116. The stub holds at least a creation date and time T16301 of a file in the NAS apparatus (B) 12 corresponding to the stub, an update date and time T16302, a last access date and time T16303, a size T16304, a migration target 16307 in which a host name and IP address for specifying the NAS apparatus (B) 12, which is the migration target, are recorded, and a migration-target storage location T16308 for specifying a storage location, of the migrated file in the NAS apparatus (B) 12, such as the directory path. The stub may also hold a migration ID T16305, which is an ID uniquely assigned when executing migration, and a migration date and time T16306.

FIG. 6 shows an example of the metadata 121162 held in the file system 12116 of the NAS apparatus (B) 12. The metadata are held for each file 121161 held by the file system 12116. The metadata 121162 holds at least file-archive and migration-related information such as a migration ID T26205, which is an ID uniquely assigned when executing migration; a WORM flag (not illustrated) for discriminating whether a file is a WORM; a migration date and time T26206; a migration source T26207 in which a host name and IP address for specifying the NAS apparatus (A) 11, which is the migration source, are recorded; a migration-source storage location T26208 for specifying a storage location of the file in the NAS apparatus (A) 11 prior to migration execution, such as a directory path, in addition to file-related information such as a file creation date and time T26201, an update date and time T26202, a last access date and time T26203, and a size T26204. The stub is managed by the file system 11116, as described earlier, the stub entity being held in the user volume 113.

FIG. 7 shows an example of the deleted file table 121163 held by the file system 12116. This table is updated each time a file 121161 is deleted by the file deletion program 12113, and records information relating to the deleted files. The deleted file table 121163 holds at least a deleted file name T26301, a migration ID T26302, a migration source T26303, a migration-source storage location T26304, and a deletion date and time T26305.

Figure 8:
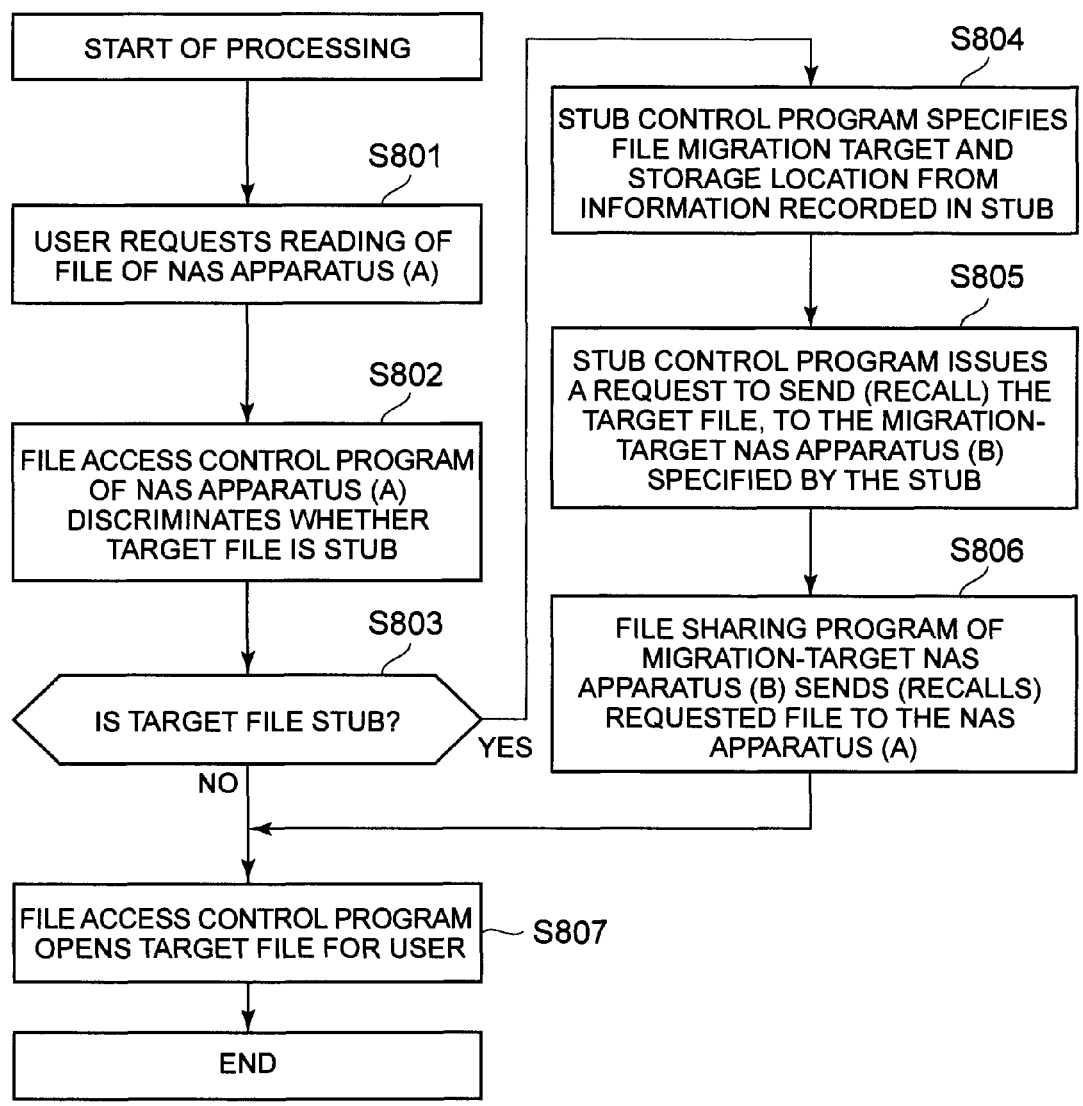
FIG. 8 is a flowchart illustrating processing when reading of a file or stub is requested.

The user is able to access files via the NAS apparatus (A) 11. A migrated file can be accessed by referring to the stub 111163. A flowchart showing an example of a processing procedure when reading a file or stub in the NAS apparatus (A) 11 is shown in FIG. 8. The user first issues a file read request to the NAS apparatus (A) 11 (S801). The file access control program 11110 of the NAS apparatus (A) 11 then discriminates whether the target file to which the user requested access is a stub (S802). If the file is not a stub (S803: NO), the file access control program 11110 proceeds with the processing of S807. If the file is a stub (S803: YES), the stub control program 11117 refers to the information recorded in the stub, and specifies information designating the NAS apparatus (B) 12 which is the target to which the file indicated by the stub is migrated, and information of the storage location in the target NAS apparatus (B) 12 (S804). Based on the information specified, the stub control program 11117 issues a request to the NAS apparatus (B) 12 to send (recall) the target file to the NAS apparatus (A) 11 (S805). After receiving the request, the file sharing program 12117 of the NAS apparatus (B) 12 sends (recalls) the requested file to the NAS apparatus (A) 11 (S806), and proceeds with the processing of S807. In the processing of S807, the file control access program 11110 of the NAS apparatus (A) 11 opens the requested file to the user, and renders the file readable.

Figure 9:
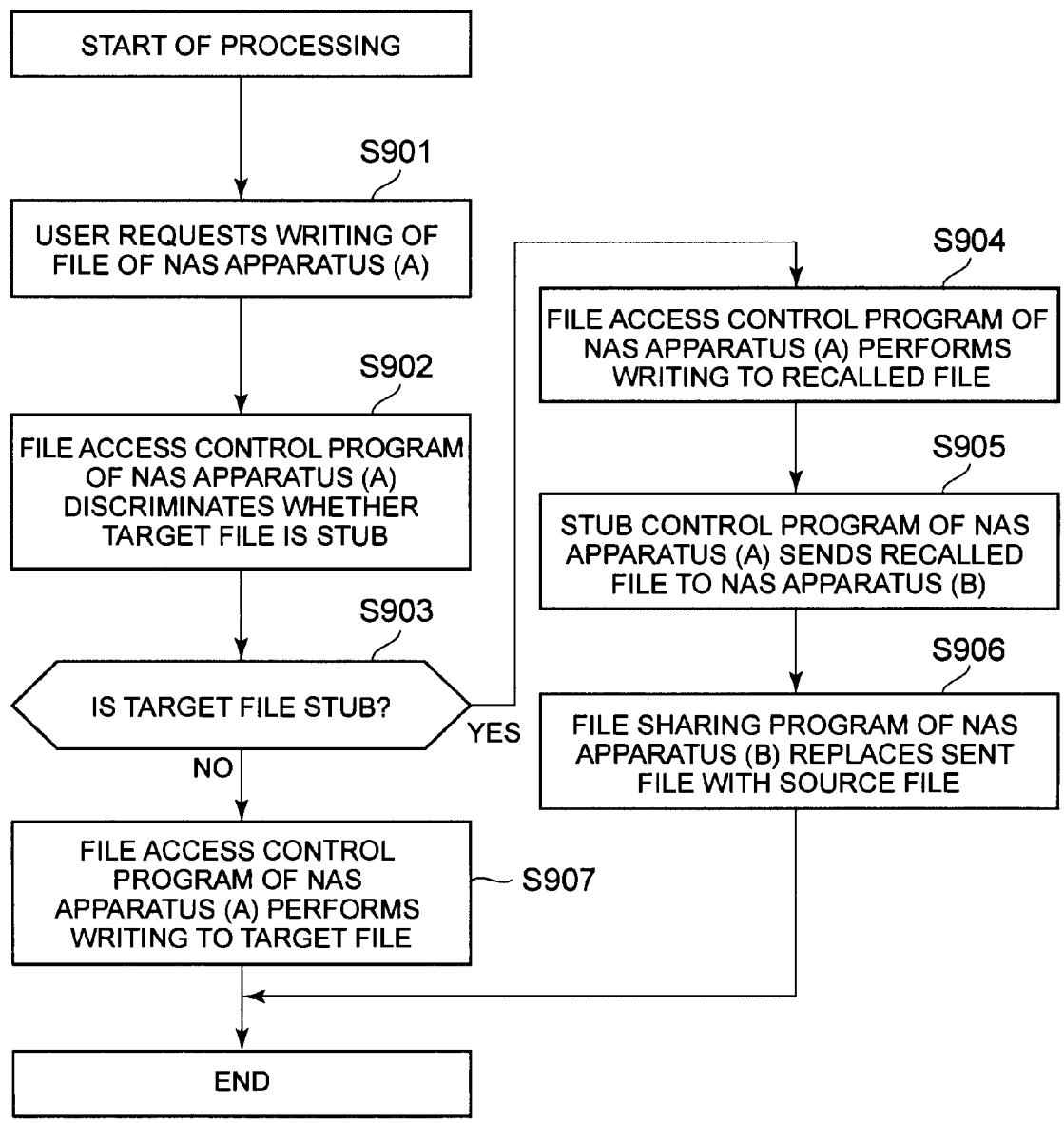
FIG. 9 is a flowchart illustrating processing when writing of a file or stub is requested.

FIG. 9 is a flowchart illustrating an example of a processing procedure when writing to a file or stub in the NAS apparatus (A) 11. First, the user issues a file write request to the NAS apparatus (A) 11 (S901). Thereafter, the file access control program 11110 of the NAS apparatus (A) 11 discriminates whether the target file to which the user requested access is a stub (S902). If the file is not a stub (S903: NO), the file access control program 11110 performs writing to the target file (S907), and ends the processing. If the file is a stub (S903: YES), the file access control program 11110 recalls the target file from the NAS apparatus (B) 12, and executes writing to the recalled file (S904). Thereafter, the stub control program 11117 sends the recalled file to the NAS apparatus (B) 12 (S905). The file sharing program 12117 of the NAS apparatus (B) 12 replaces the sent file with the source file (S906), and ends the processing.

Figure 10:
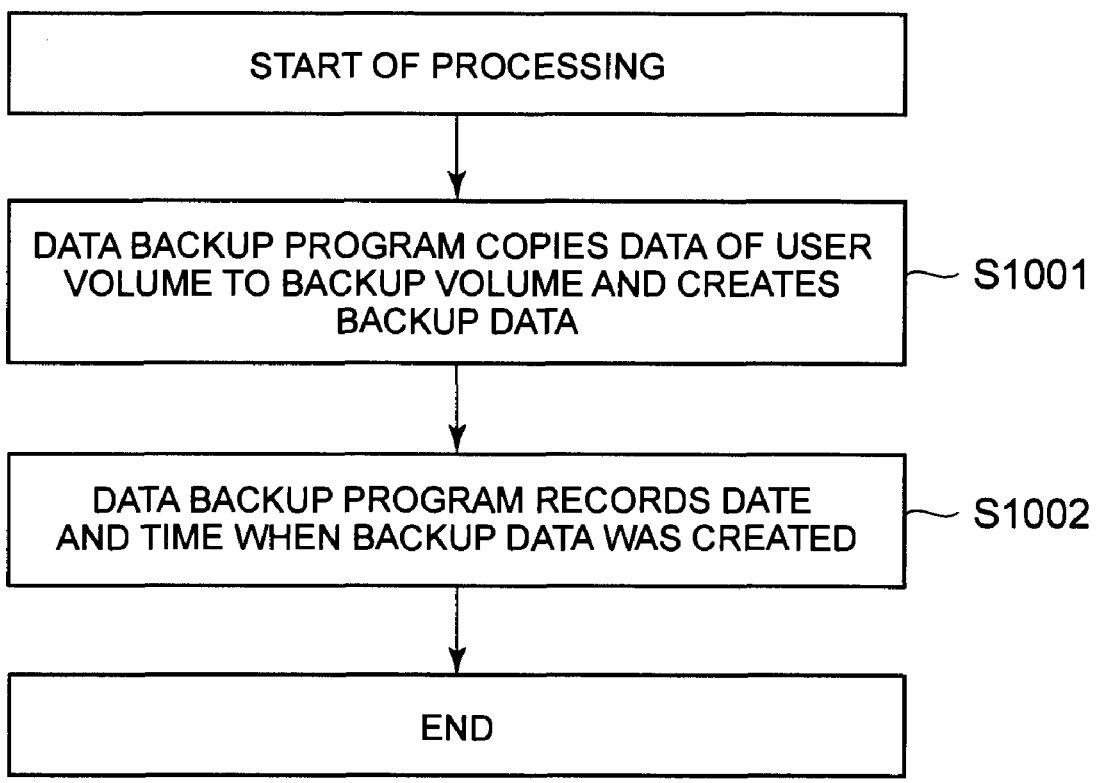
FIG. 10 is a flowchart illustrating processing when a user volume 113 is backed up in the NAS apparatus (A)

FIG. 10 is a flowchart showing an example of a backup processing procedure in the NAS apparatus (A) 11. First, the data backup program 11114 copies the data of the user volume 113 to the backup volume 115, and creates backup data (S1001). Thereafter, the data backup program 11114 records the date and time obtained by creating the backup data (S1002), and ends the processing. Note that recovery is carried out by copying backup data to the user volume 113. Backup processing may be executed at regular intervals in accordance with a schedule set by the user, or may be executed in response to a user instruction, for example. Furthermore, a backup may be performed in user volume units or in file units.

The present embodiment exemplifies a method of repairing an information mismatch between a stub 111163 created in the NAS apparatus (A) 11, and a file 121161 in the NAS apparatus (B) 12 indicated by the stub. An inconsistency of this type is caused by migration or file deletion between the NAS apparatus (A) 11 and the NAS apparatus (B) 12, and by recovery utilizing backup data of the NAS apparatus (A) 11.

Figure 11:
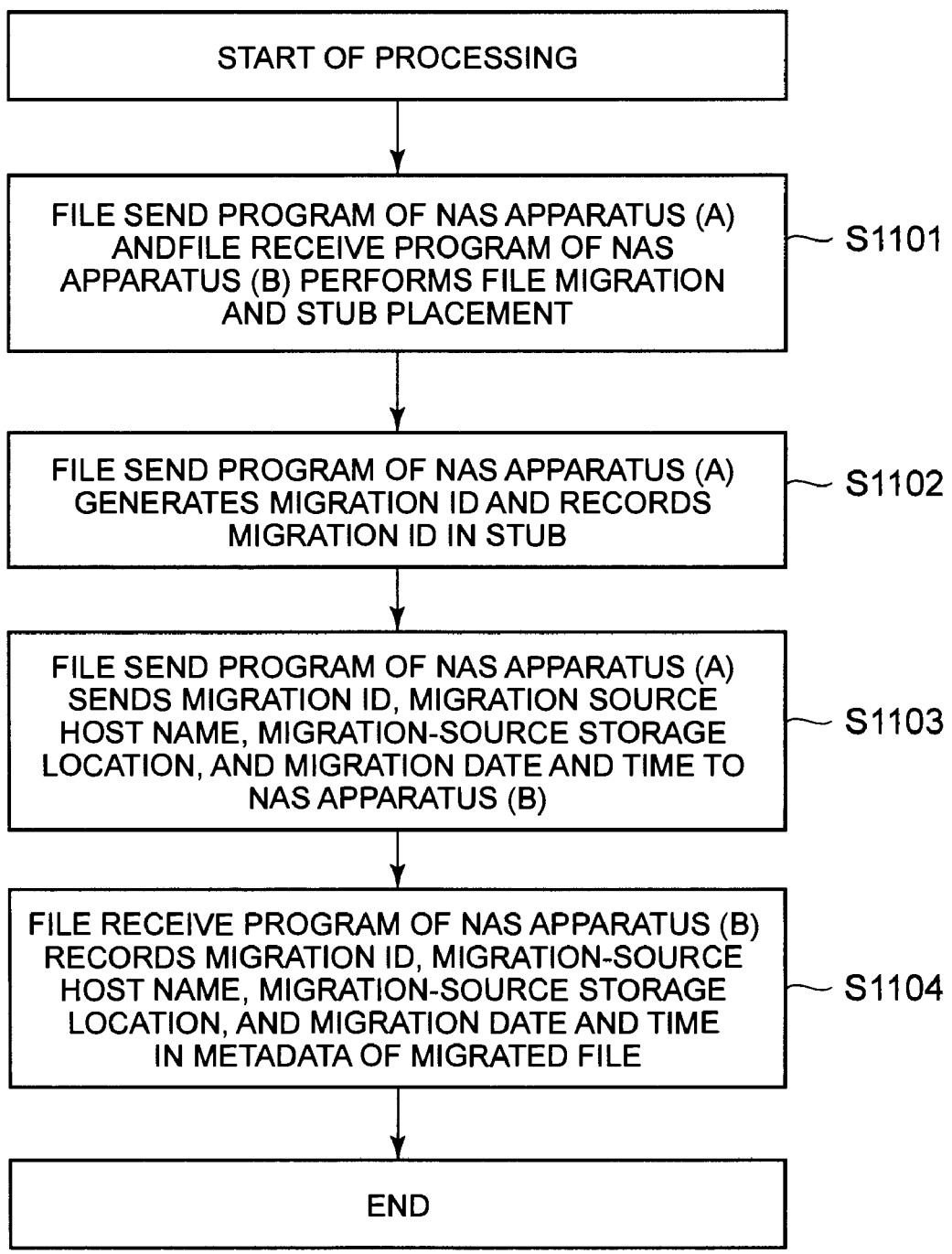
FIG. 11 is a flowchart illustrating processing in which file migration is executed.

FIG. 11 is a flowchart showing an operating procedure when executing migration from the NAS apparatus (A) 11 to the NAS apparatus (B) 12. The NAS apparatus (A) 11 is a high-speed, low-capacity storage apparatus corresponding to Tier 1. The NAS apparatus (B) 12 is a low-speed, high-capacity storage apparatus that corresponds to Tier 2 and is mainly used for archive applications. In other words, migration from the NAS apparatus (A) 11 to the NAS apparatus (B) 12 is performed by targeting files with low-frequency access stored in the NAS apparatus (A) 11 and/or files for which a fixed period has elapsed since the files were updated, for example.

In migration processing from the NAS apparatus (A) 11 to the NAS apparatus (B) 12, migration of the file 111161 is first executed by the file send program 11111 in the NAS apparatus (A) 11 and the file receive program 12111 in the NAS apparatus (B) 12 (S1101). Migration may be executed with user-instructed timing, using files designated by the user as a target, or may be executed in accordance with a preset schedule, using files matching preset conditions as a target. For example, a certain file may be migrated when a fixed period has elapsed since the latest update time. The migrated file is stored as a file 121161 in the file system 12116 in the NAS apparatus (B) 12. At the same time, the migrated file 111161 is replaced with a stub 111163, and information indicating the migration target file is recorded. Subsequently, the file send program 11111 generates a unique migration ID each time migration is executed, and records this migration ID in the stub 111163 (S1102). In addition, the file send program 11111 sends the generated migration ID, the migration-source storage location, and the migration date and time to the NAS apparatus (B) 12 (S1103). The file receive program 12111 of the NAS apparatus (B) 12 stores the sent information in the metadata 121162 of the migrated file 121161 (S1104).

As described hereinabove, information for restoring the stub from the file 121161 of the NAS apparatus (B) 12 can be held as metadata.

Figure 12:
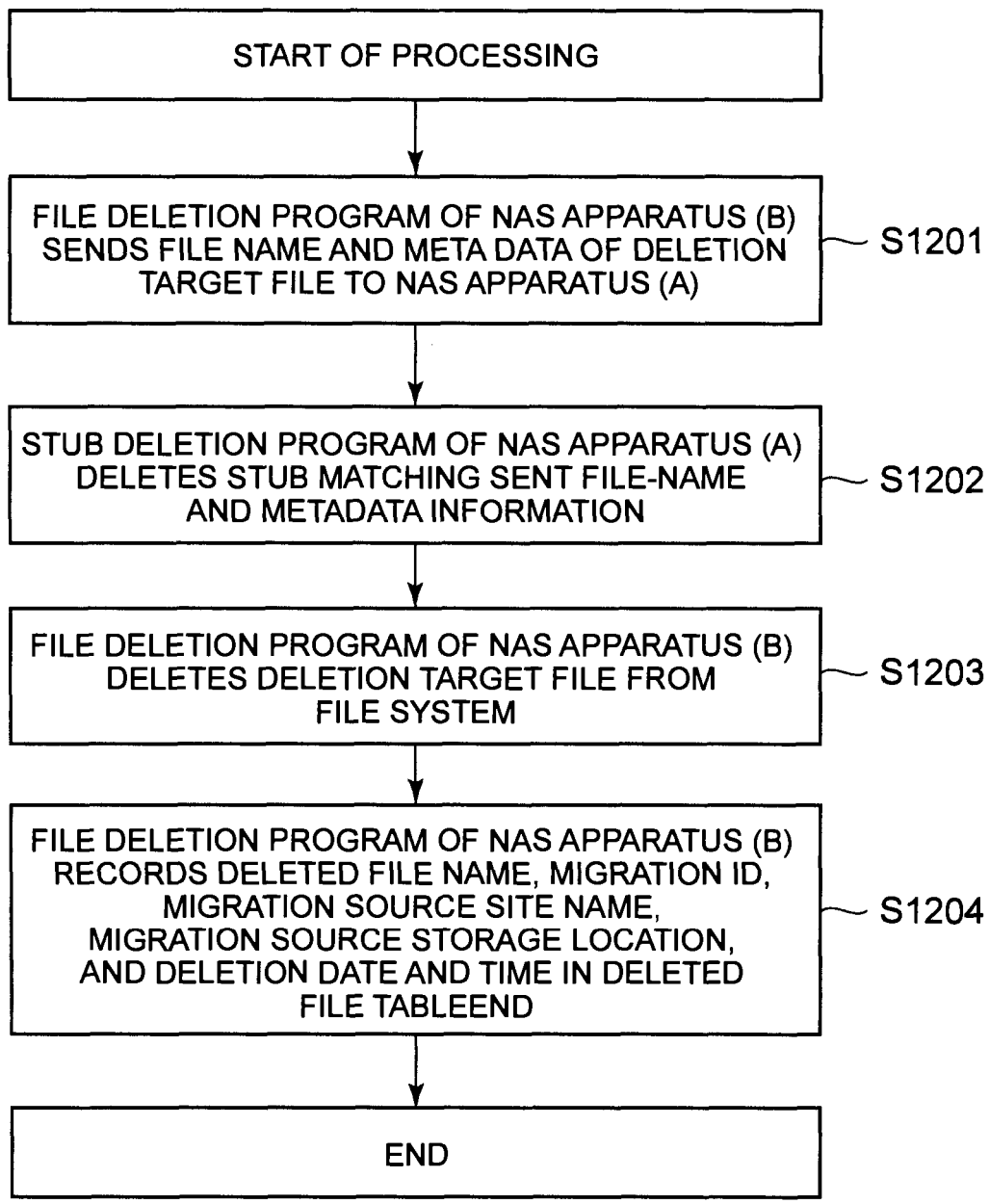
FIG. 12 is a flowchart illustrating processing in which a file in the NAS apparatus (B) is deleted.

FIG. 12 is a flowchart showing a processing procedure when deleting a file in the NAS apparatus (B) 12. File deletion may be executed with user-instructed timing, with a user-designated file as a target, or may be executed in accordance with a preset schedule, with a file conforming to a preset condition serving as a target. For example, processing to delete a certain file may be executed when a fixed period has elapsed since the file was stored in the NAS apparatus (B) 12 or after a statutory protection period of the file has elapsed. First, the file deletion program 12113 sends the file name and metadata 121162 of the deletion target file to the NAS apparatus (A) 11 (S1201). The stub deletion program 11113 of the NAS apparatus (A) 11 then confirms the migration-source storage location in the file name and metadata sent in S1201, and deletes the conforming stub 111163 (S1202). The file deletion program 12113 of the NAS apparatus (B) 12 then executes deletion of the deletion target file 121161 (S1203). The file deletion program 12113 also records the file name, migration source site name, migration-source storage location, deletion date and time, in the deleted file table 121163 (S1204).

The deletion of a stub 111163 in the NAS apparatus (A) 11, which corresponds to a deleted file in the NAS apparatus (B) 12, and, in cases where a deleted stub is restored, the holding of information for deleting the stub in the deleted file table 121163 can be implemented as described hereinabove.

When a fault is generated in file data or other data in the NAS apparatus (A) 11, recovery processing is executed by copying backup data at a certain time point in the NAS apparatus (A) 11, and stored in the backup volume 114 created by the backup processing, to the user volume 113 of the NAS apparatus (A) 11. In other words, when recovery processing is executed, data of the NAS apparatus (A) 11 is returned to data at a previous time point. Note that recovery may be performed in user volume units or in file units. When migration, and file deletion in the NAS apparatus (B) 12 are executed, and recovery using backup data in the NAS apparatus (A) 11 is executed, an inconsistency is generated between the stub of the NAS apparatus (A) 11 and the file of the NAS apparatus (B) 12. A time series for when a typical mismatch is generated, and the states of files and stubs in each NAS apparatus are shown in FIGS. 13 and 14.

Figure 13:
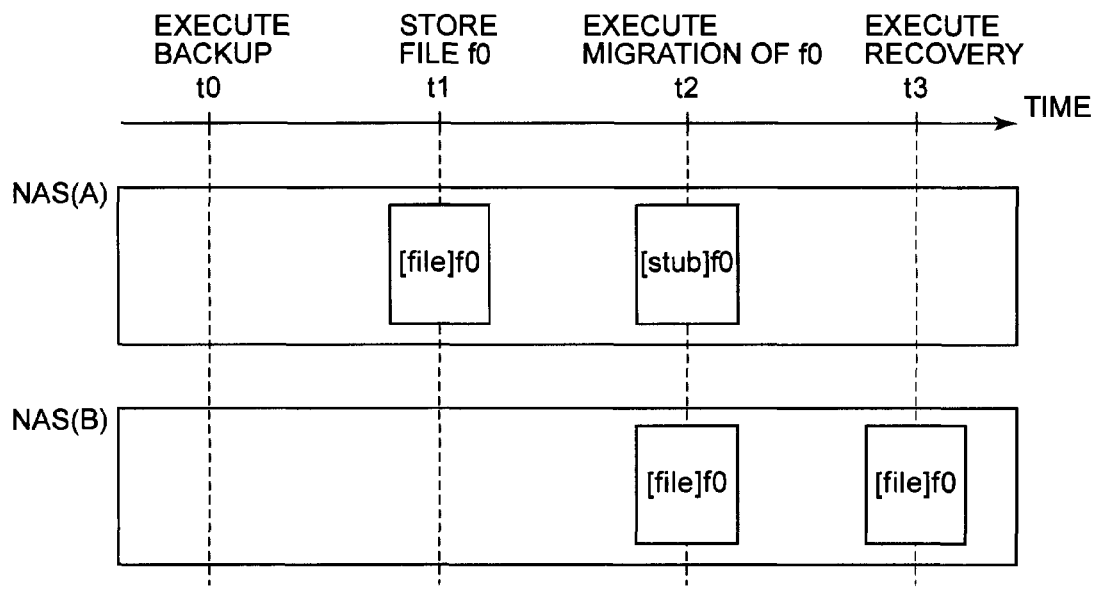
FIG. 13 is a schematic diagram showing a time series for when migration and recovery are executed, and states of both NAS apparatuses.

FIG. 13 shows an example of a state where an inconsistency is generated when migration and recovery are executed. FIG. 13 shows the states of allocation of a file and a stub in the NAS apparatus (A) 11 and NAS apparatus (B) 12, at each time an operation is executed; at time t0, at which a backup is executed and backup data is created, no file or stub exists in either of the NAS apparatuses. When a file f0 is stored at time t1, a file is stored in the NAS apparatus (A) 11. When migration of file f0 is executed at time t2, file f0 in the NAS apparatus (A) 11 is replaced with stub f0, and file f0 is stored in the NAS apparatus (B) 12. Thereafter, at time t3, when recovery of the NAS apparatus (A) 11 is executed using backup data, the NAS apparatus (A) 11 is returned to the state at time t0 when backup data was created, hence a state where no file or stub exists in the NAS apparatus (A) 11 is assumed. This results in a state where file f0 still exists in the NAS apparatus (B) 12 but a stub indicating f0 does not exist in the NAS apparatus (A) 11. Furthermore, in cases where a backup is executed between times t1 and t2, when recovery of the NAS apparatus (A) 11 is executed using the backup data, file f0 is stored in the NAS apparatus (A) 11 instead of the stub indicating f0. In this case, the file f0 of the NAS apparatus (A) 11 can be accessed from the client computer 17, but file f0 exists in both the NAS apparatus (A) 11 and the NAS apparatus (B) 12, which wastefully consumes the capacity of the NAS apparatus (B) 12.

Figure 14:
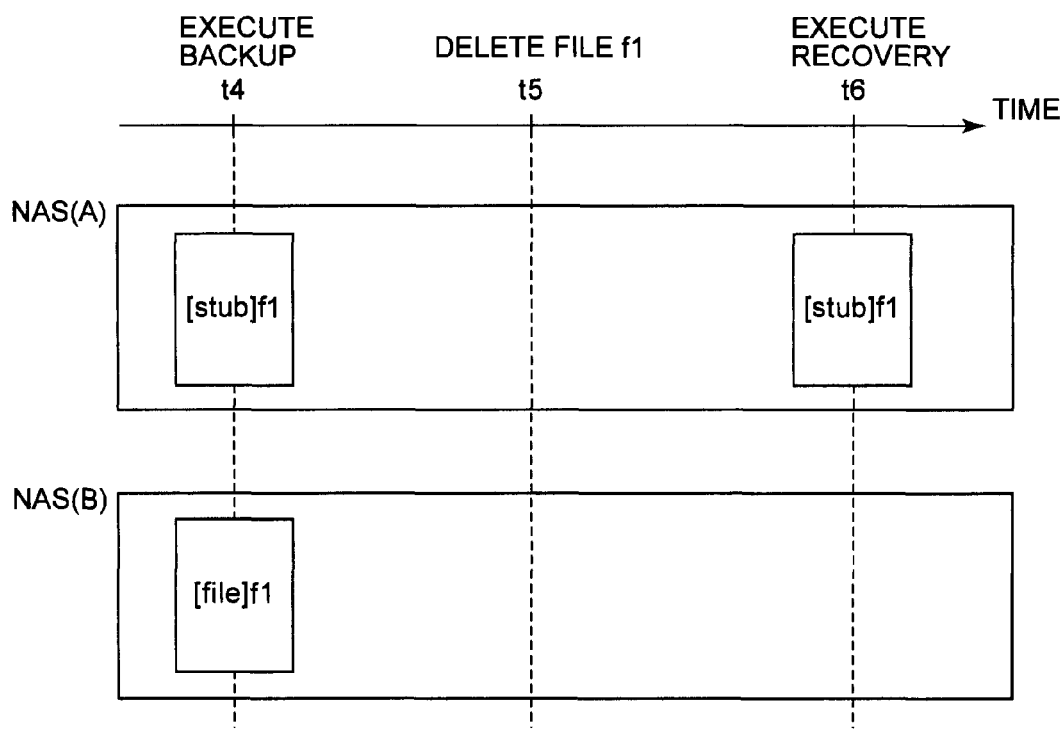
FIG. 14 is a schematic diagram showing a time series for when file deletion and recovery are executed, and states of both NAS apparatuses.

FIG. 14 shows an example of a state where an inconsistency is generated when file deletion and recovery are executed. At time t4, when backup data is created by executing a backup, a stub f1 exists in the NAS apparatus (A) 11 and a file f1 exists in the NAS apparatus (B) 12. When file f1 is deleted at time t5, no file or stub exists in both NAS apparatuses. Subsequently, at time t6, when recovery of the NAS apparatus (A) 11 is executed using the backup data, the NAS apparatus (A) 11 is returned to the state of time t4 when the backup data was created, and therefore a state where stub f1 exists once again in NAS apparatus (A) 11 is assumed. However, this leads to an inconsistency state in which stub f1 is present once again in the NAS apparatus (A) 11 but file f1 indicated by stub f1 does not exist in the NAS apparatus (B) 12.

Figure 15:
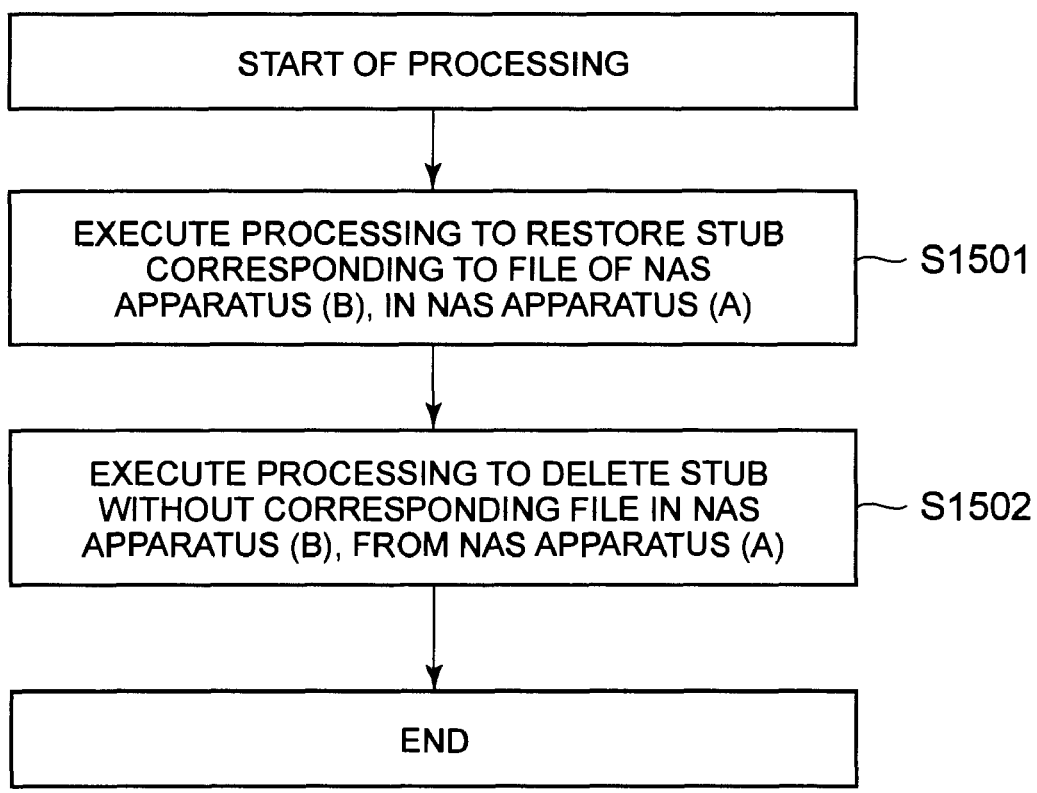
FIG. 15 is a flowchart illustrating processing in which a mismatch, between a stub of the NAS apparatus (A) and a file of the NAS apparatus (B), is repaired.

FIG. 15 is a flowchart showing a processing procedure when repairing an inconsistency of information between a stub 111163 of the NAS apparatus (A) 11 and a file 121161 of the NAS apparatus (B) 12. Repairing of the mismatch may be executed with user-instructed timing or executed in accordance with a preset schedule. First, processing to restore the stub, corresponding to the file in the NAS apparatus (B) 12, in the NAS apparatus (A) 11 is executed (S1501). Details of this processing will be provided subsequently using FIGS. 16 to 18. Subsequently, processing to delete a stub, for which a corresponding file does not exist in the NAS apparatus (B) 12, from the NAS apparatus (A) 11 is executed (S1502). Details of this processing will be described subsequently using FIGS. 13 and 14.

As described earlier, an inconsistency between the stub of the NAS apparatus (A) 11 and the file of the NAS apparatus (B) 12 can be detected and repaired.

This mismatch can be generated frequently when performing recovery processing of the NAS apparatus (A) 11 using backup data at a certain point in the past, as described earlier. Hence, in order to eliminate the mismatch rapidly, mismatch detection and repair processing are preferably executed in accordance with the recovery processing. A method of executing mismatch detection and repair processing in accordance with recovery processing of the NAS apparatus (A) 11 will be described hereinbelow.

Figure 16:
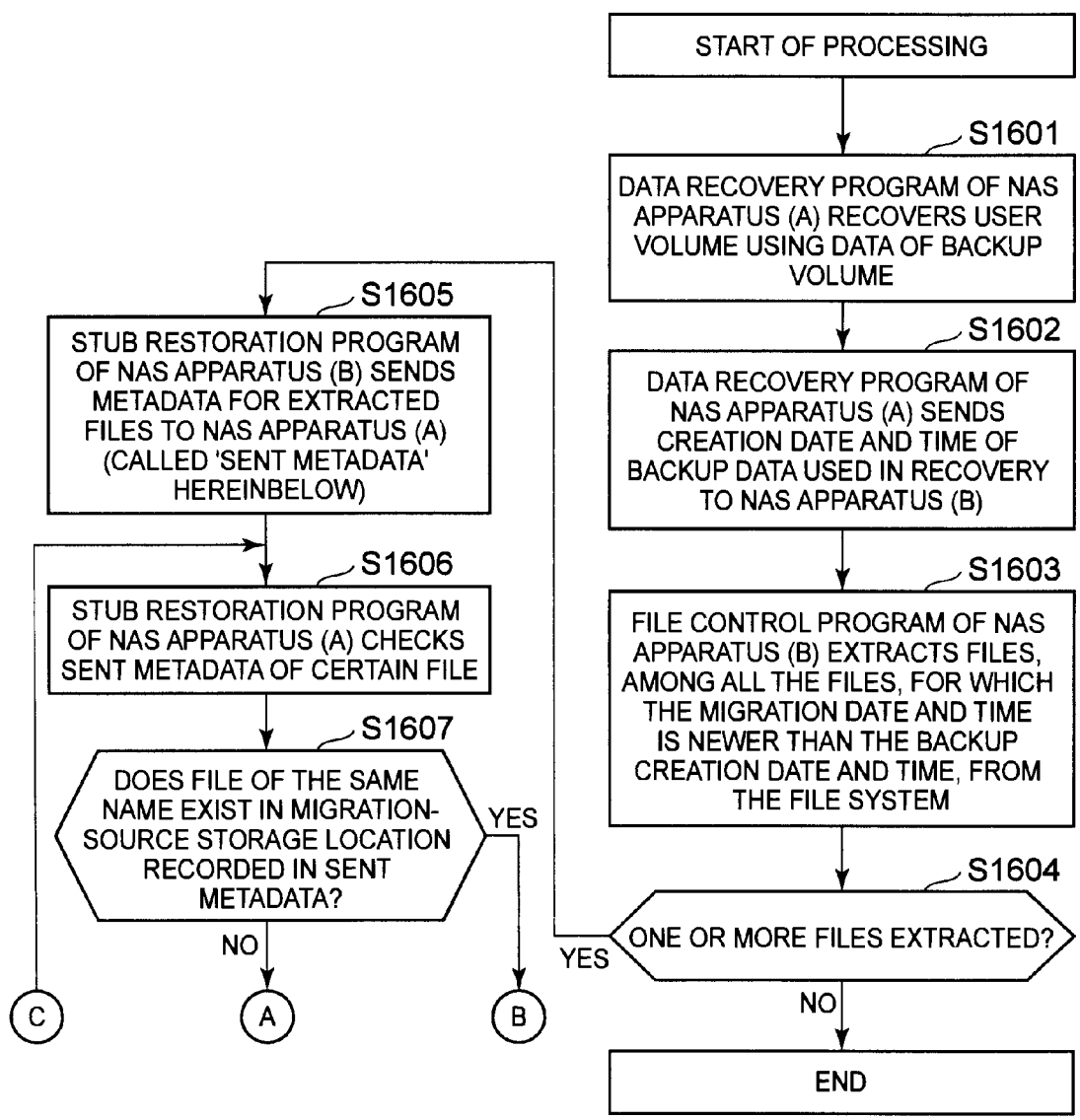
FIG. 16 is a flowchart illustrating processing in which a stub is restored in order to repair an inconsistency generated by executing a restore.
Figure 17:
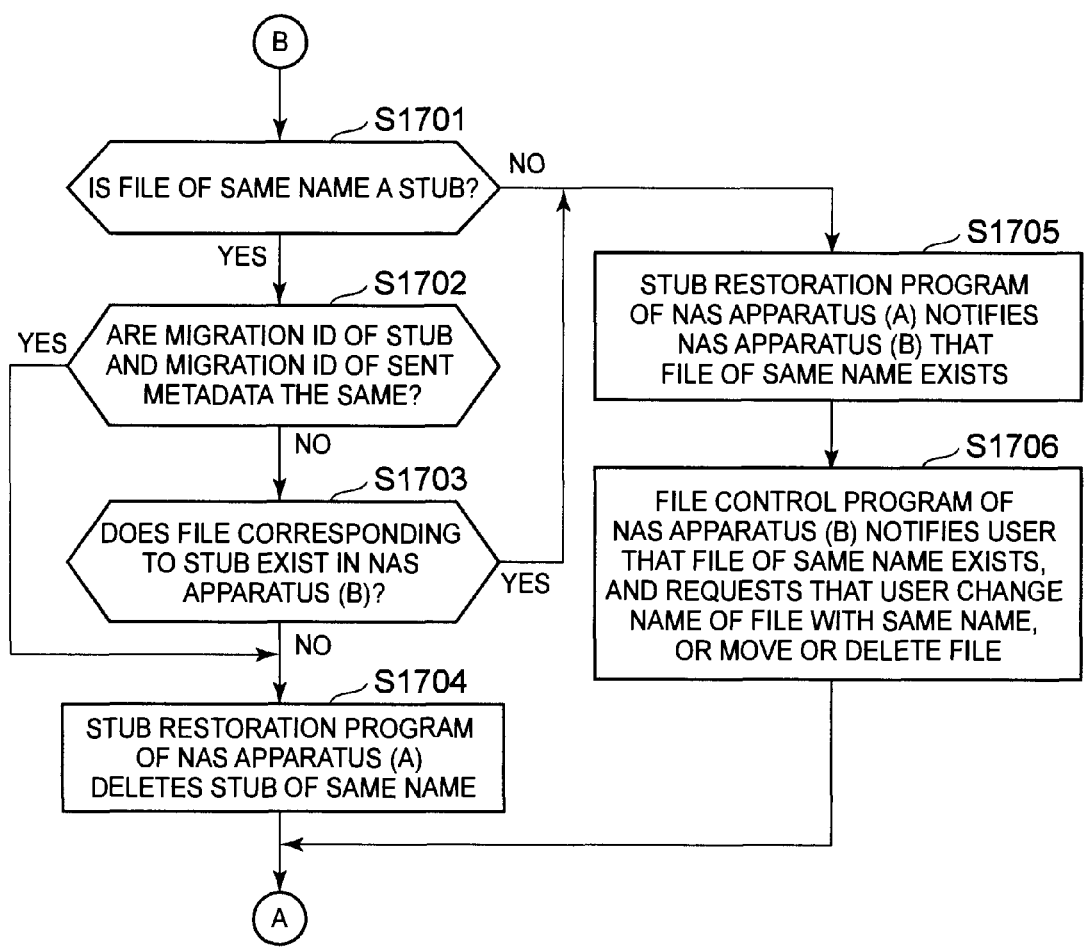
FIG. 17 is a flowchart illustrating processing in which a stub is restored in order to repair an inconsistency caused by executing a restore.
Figure 18:
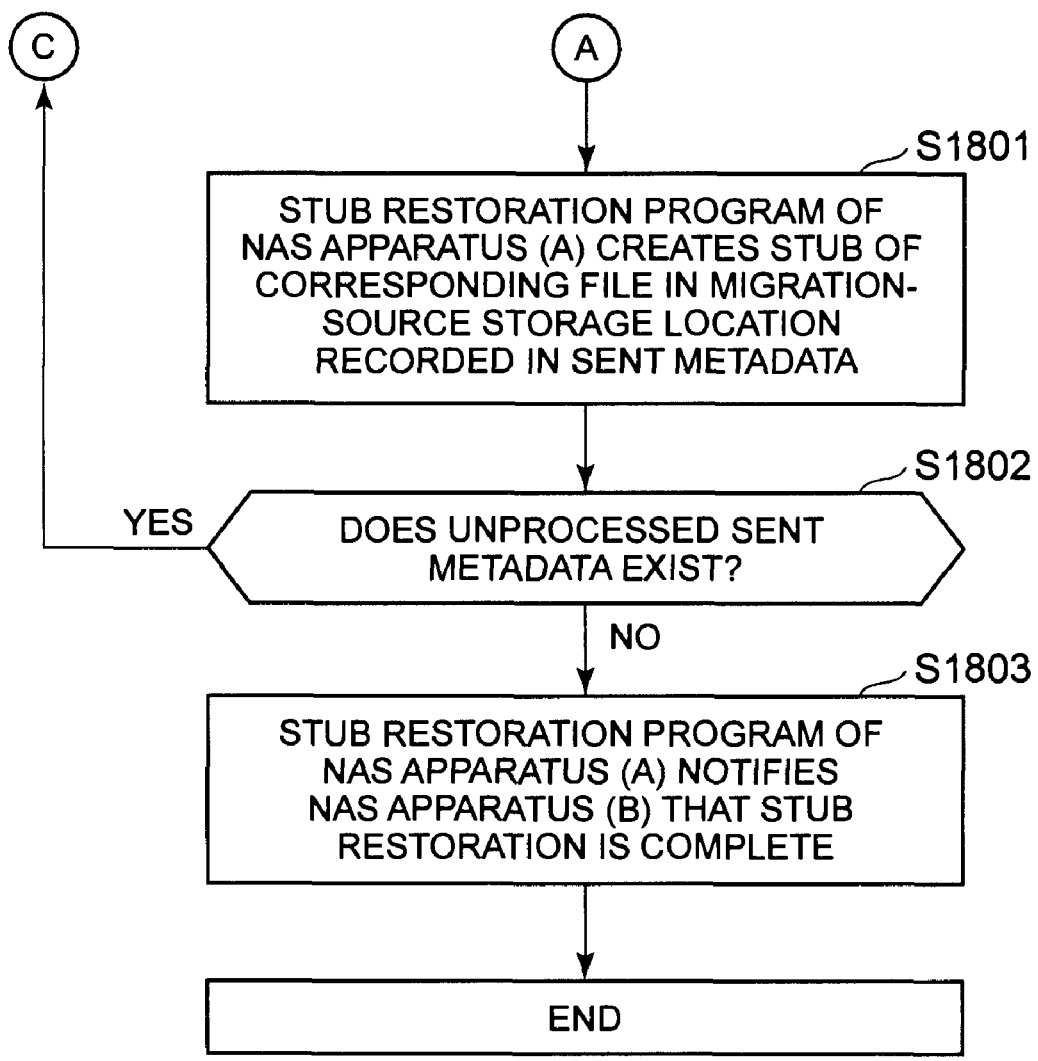
FIG. 18 is a flowchart illustrating processing in which a stub is restored in order to repair an inconsistency caused by executing a restore.

FIGS. 16 to 18 are flowcharts showing a detailed processing procedure for processing to restore a stub, in the NAS apparatus (A) 11, which corresponds to a file in the NAS apparatus (B) 12, in order to repair an inconsistency generated through migration and recovery. First, the data recovery program 11115 of the NAS apparatus (A) 11 executes recovery processing of the user volume 113 using data of the backup volume 114 (S1601). At this time, the data recovery program 11115 sends the backup data creation date and time of the backup volume 114 used for recovery to the NAS apparatus (B) 12 (S1602). The file control program 12112 of the NAS apparatus (B) 12 searches for files 121161 in the file system 12116, and extract files for which the migration date and time T26207 recorded in the metadata 1211622 is newer than the received backup data creation date and time (S1603). In this extraction, the file control program 12112 extracts file data for which the stub may have been lost due to the recovery processing of the NAS apparatus (A) 11 using the backup data at the point where the stub indicating the storage location of the file data in the NAS apparatus (B) 12 was to be stored in the NAS apparatus (A) 11 (S1604). In other words, the file control program 12112 extracts the file with which the mismatch in FIG. 14 was generated. Here, when not a single file is extracted (S1604: NO), it is considered that there are no files for which a stub should be restored, and the processing is terminated. When one or more files are extracted (S1604: YES), stubs corresponding to these files may be considered to not exist in the NAS apparatus (A) 11, and therefore the file control program 12112 sends metadata 121162 of the extracted files to the NAS apparatus (A) 11 (S1605). Here, the metadata sent will be referred to hereinafter as 'sent metadata'. The stub restoration program 11112 of the NAS apparatus (A) 11 then checks the content of a certain single sent metadata (S1606), and checks whether a file of the same name as the file corresponding to the sent metadata exists in the migration-source storage location recorded in the sent metadata (S1607).

In cases where it is judged in S1607 that a file of the same name does not exist (S1607: NO), it is considered that a stub corresponding to the file 121161 in the NAS apparatus (B) 12 does not exist. Hence, the stub restoration program 11112 of the NAS apparatus (A) 11 creates a stub, which indicates a file corresponding to the sent metadata, in the migration-source storage location recorded in the sent metadata (S1801 in FIG. 18). Thereafter, the stub restoration program 11112 discriminates whether or not unprocessed sent metadata exists (S1802). When unprocessed sent metadata exists (S1802: YES), the stub restoration program 11112 returns to S1606 and executes processing once again for the other sent metadata. When unprocessed sent metadata does not exist (S1802: NO), the stub restoration program 11112 notifies the NAS apparatus (B) 12 (S1803) that stub restoration processing is complete, and ends the processing.

In cases where it is judged in S1607 that a file of the same name exists (S1607: YES), the stub restoration program 11112 discriminates whether the file is a stub by checking the stub flag T26210 in the file metadata (S1701). When the file is a stub (S1701: YES), the stub restoration program 11112 compares the migration ID T26205 recorded in the file metadata with the migration ID T16305 recorded in the stub, and checks whether these two migration IDs are equal (S1702). If different (S1702: NO), it is judged that, despite having the same name, the stub and file name are unrelated, having been generated on different occasions of migration execution. The stub restoration program 11112 queries the NAS apparatus (B) 12 for the existence of the file indicated by the stub (S1703). If the file does not exist (S1703: NO), the stub indicates an invalid file, and the stub restoration program 11112 therefore deletes the stub (S1704). Thereafter, the stub restoration program 11112 executes the processing S1201 described earlier.

In cases where it is judged in S1702 that the migration IDs of the stub and sent metadata are equal, (S1702: YES), the stub, and the file corresponding to the sent metadata are judged to be related, both having been generated during the course of a certain migration processing. When a case is considered where information of a stub and a file do not match, the information is made consistent by deleting the stub or creating a new stub. Hence, a stub is deleted by performing the processing of S1704 and a stub is created by performing the processing of S1801.

In a case where it is judged in S1701 that the file is not a stub (S1701: NO), or in a case where it is judged in S1703 that a file corresponding to the stub exists in the NAS apparatus (B) 12, since a file of the same name as the stub to be restored exists, the stub cannot be restored. The NAS apparatus (A) 11 therefore notifies the NAS apparatus (B) 12 that a file of the same name exists (S1705). Upon receiving the notification, the NAS apparatus (B) 12 notifies the user that a file of the same name exists and asks the user to change the name of the same-name file, or to move or delete this file (S1706). After a user operation is executed, the NAS apparatus (B) 12 executes the processing of S1801.

As described hereinabove, only a file migrated after the backup data creation date and time is regarded as the file that generated the inconsistency, and therefore the generation of an inconsistency can be detected by searching for the corresponding file. Furthermore, a detected mismatch can be eliminated by restoring a stub matching the file of the NAS apparatus (B) 12, on the basis of metadata that the NAS apparatus (A) 11 receives from the NAS apparatus (B) 12.

Figure 19:
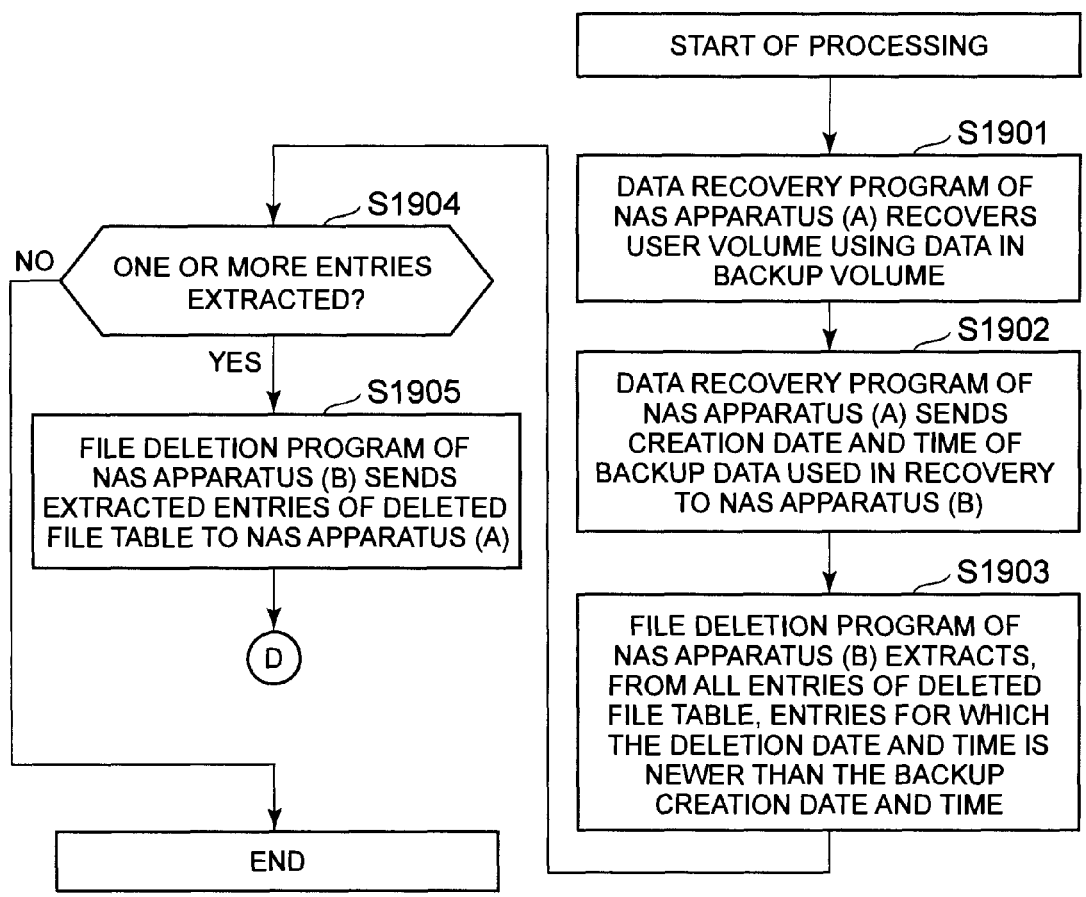
FIG. 19 is a flowchart illustrating processing in which a disused stub is deleted in order to repair an inconsistency caused by executing a restore.
Figure 20:
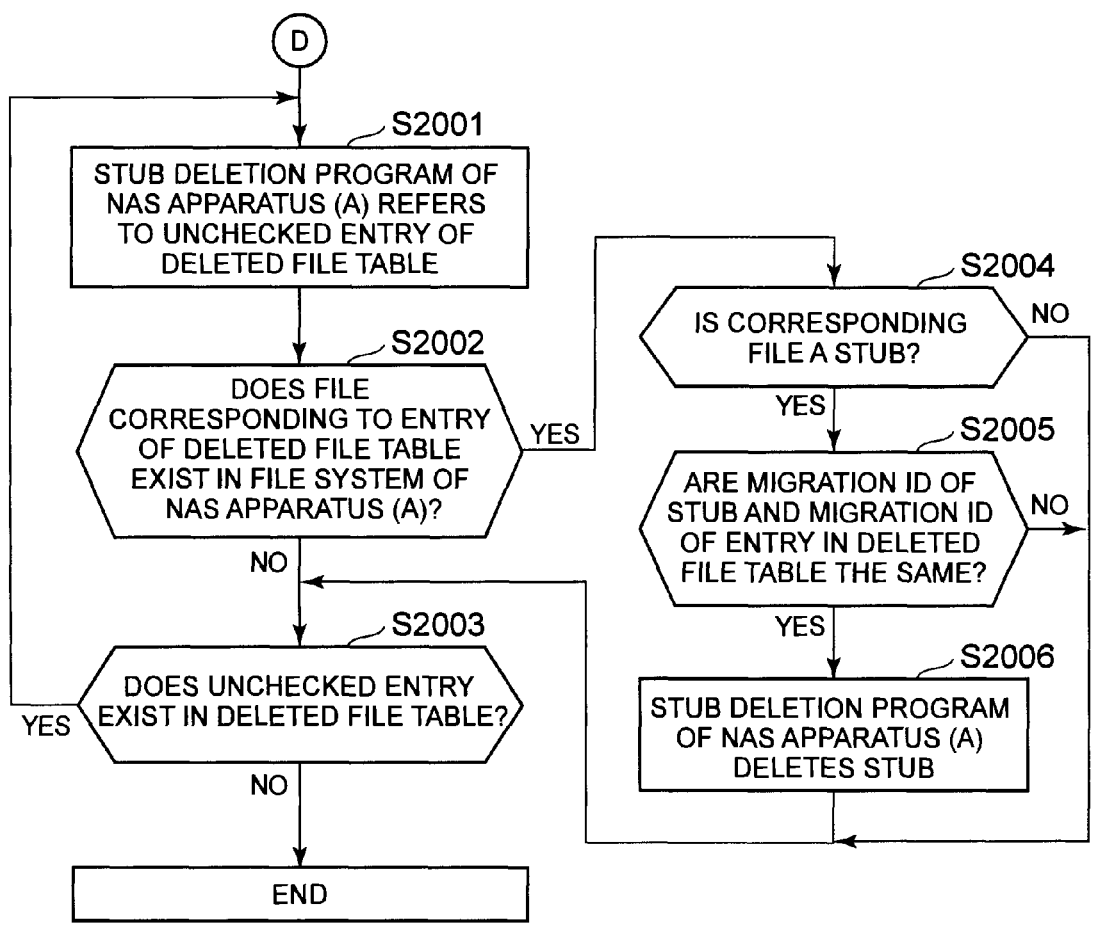
FIG. 20 is a flowchart illustrating processing in which a disused stub is deleted in order to repair an inconsistency caused by executing a restore.

FIGS. 19 and 20 is a flowchart showing a processing procedure for a case where a disused stub is restored by performing recovery using the NAS apparatus (A) 11 and where the stub, for which a corresponding file does not exist in the NAS apparatus (B) 12, is deleted from the NAS apparatus (A) 11. First, the data recovery program 11115 of the NAS apparatus (A) 11 executes recovery processing of the user volume 113 using data of the backup volume 114 (S1901). At this time, the data recovery program 11115 sends the backup data creation date and time of the backup volume 114 used in the recovery to the NAS apparatus (B) 12 (S1902). The file deletion program 12113 of the NAS apparatus (B) 12 searches the deleted file table 121163, and extracts entries for which the deletion date and time T26305 is newer than the backup data creation date and time (S1903). When not a single entry is extracted (S1904: NO), the file deletion program 12113 considers that there is no stub to be deleted, and ends the processing. When one or more entries are extracted (S1904: YES), the mismatch state shown in FIG. 14 may be considered to have been generated. In other words, regardless of whether the files of these entries have already been deleted in the NAS apparatus (B) 12, disused stubs indicating these files can be considered to exist in the NAS apparatus (A) 11. The file deletion program 12113 of the NAS apparatus (B) 12 therefore sends the extracted entries to the NAS apparatus (A) 11 (S1905). The stub deletion program 11113 of the NAS apparatus (A) 11 refers to the received, as yet unchecked entries in the deleted file table (S2001), and checks whether files corresponding to the entries exist in the file system 11116 of the NAS apparatus (A) 11 (S2002). In cases where corresponding files do not exist (S2002: NO), the stub deletion program 11113 checks whether unchecked entries remain in the deleted file table. If there are no remaining unchecked entries (S2003: NO), the stub deletion program 11113 ends the processing. If unchecked entries exist (S2003: YES), the stub deletion program 11113 returns to S2001 and executes the processing once again for the other entries.

When a corresponding file exists in S2002 (S2002: YES), the stub deletion program 11113 checks whether the corresponding file is a stub (S2004). If the corresponding file is a stub (S2004: YES), the stub deletion program 11113 checks whether the migration ID held by the stub, and the migration ID recorded in the entry in the deleted file table are the same (S2005). If the IDs are the same (S2005: YES), the stub deletion program 11113 deletes the stub (S2006). Thereafter, the stub deletion program 11113 performs the processing of S2003. When the corresponding file is not a stub in S2004 (S2004: NO), or when the migration IDs are not the same in S2005 (S2005: NO), the corresponding file or stub is judged to be unrelated to the deleted file recorded in the deleted file table, and the stub deletion program 11113 moves to the processing of S2003.

As described hereinabove, only stubs corresponding to files deleted after the backup data creation date and time are considered as stubs generating an inconsistency, and therefore the generation of an inconsistency can be detected by retrieving information of deleted files, and disused stubs can be deleted.

When recovery is performed using backup data with a creation date and time older than the oldest deletion date and time of the deleted file table 121163 used here, there may sometimes be a shortage of entries required for stub deletion, and hence it may not be possible to delete all disused stubs. This occurs in cases where the area for storing the deleted file table is inadequate, and so on. Here, when the user is about to execute recovery using backup data, the data recovery program 11115 acquires the oldest deletion date and time from the NAS apparatus (B) 12 and, in cases where the backup data creation date and time is older than the oldest deletion date and time, the user may be warned that a disused stub may remain. Furthermore, in cases where recovery is executed using old backup data, the stub deletion program 11113 may check whether files corresponding to all the stubs exist by querying the NAS apparatus (B) 12, and may delete stubs for which corresponding files do not exist.

In the present embodiment, the repair of inconsistency generated by executing recovery has been described. However, repair may also be executed on occasions other than recovery. For example, when backup data does not exist, by using metadata information of the files in the NAS apparatus (B) 12, stubs corresponding to all the files can be created in the NAS apparatus (A) 11. This composition is implemented by executing processing, which targets only files for which an inconsistency was generated through recovery processing, for all the files. This composition is useful in cases where a new NAS apparatus (A) 11 is installed in a system running only on the NAS apparatus (B) 12.

According to the present embodiment, an inconsistency of a file and a stub between the two NAS apparatuses, generated by executing a restore using backup data, can be repaired after specifying the file and stub that generated the mismatch from the creation date and time of the backup data used for the restore.

According to the present embodiment, in a storage system that executes stub-based HSM, an inconsistency between a stub in a higher tier and data in a lower tier can be easily detected and repaired.

The invention claimed is:

1. A storage system, comprising:
a first storage apparatus coupled to a client computer and including;
a first processor,
a first memory storing a program executed by the first processor,
a first storage area storing a plurality of file data which are access targets of the client computer, and
a second storage area storing backup data of the file data by control of the first processor; and
a second storage apparatus coupled to the first storage apparatus and including;
a second processor,
a second memory storing a program executed by the second processor, and
a third storage area storing the file data migrated from the first storage area by control of the first and second processors, wherein
when backup of the plurality of file data from the first storage area to the second storage area is executed,
the first processor creates copy data of the plurality of file data as backup data and stores the backup data in the second storage area, and manages a first time at which the backup data is created, and,
when one or more first file data included in the plurality of file data is migrated from the first storage area to the third storage area,
the first processor creates a stub indicating a storage location for the first file data in the third storage area, stores the stub in place of the first file data in the first storage area, and sends the first file data to the third storage area, and
the second processor stores the first file data, received from the first storage apparatus by control of the first processor, in the third storage area, and manages a second time at which each of the first file data is migrated, and
when the plurality of file data of the first storage area is recovered using the backup data in the second storage area,
the first processor replaces the plurality of file data in the first storage area with the backup data in the second storage area, and sends the first time to the second storage apparatus,
the second processor compares the first time received from the first storage apparatus with the second time for each of the one or more first file data stored in the third storage area, and extracts first file data from the one or more first file data for which the second time is newer than the first time, and
the first processor restores a stub indicating a storage location in the third storage area of the extracted first file data, and stores the stub in the first storage area.

2. The storage system according to claim 1, wherein after the first file data of the plurality of file data is migrated from the first storage area to the third storage area,
in cases where access to the first file data of the plurality of file data is received from the client computer, the first processor judges whether or not the first file data is file data replaced with a stub, and
in cases where the first file data is file data replaced with a stub, the first processor specifies a storage location in the third storage area of the first file data, according to information of the stub, and supplies the first file data stored in the third storage area to the client computer.

3. The storage system according to claim 2, wherein the second storage apparatus is a storage apparatus of a lower performance or a higher capacity than the first storage apparatus, and
the first processor migrates file data for which a fixed period has elapsed since the last update time, of the plurality of file data, from the first storage area to the third storage area.

4. The storage system according to claim 3, wherein the stub stored in the first storage area of the first storage apparatus exists for each of the first file data migrated from the first storage area to the third storage area, and is information which includes an identifier for each file data migration, a migration time, and a storage location in the third storage area of the first file data,
the second processor sends, to the first storage apparatus, information relating to the identifier, the migration time, and the storage location in the third storage area of the first file data, the sent information corresponding to first file data which is extracted from the one or more first file data and for which the second time is newer than the first time, and
the first processor restores a stub for the extracted file data on the basis of information received from the second storage apparatus, and stores the stub in the first storage area.

5. The storage system according to claim 1, wherein
in cases where one or more second file data of a plurality of migrated file data stored in the third storage area is deleted, the second processor performs control to manage a deletion time of each of the second file data as a third time, and to delete a stub which corresponds to the second file data and which is stored in the first storage area, and
when a fault occurs in the first storage area, and the plurality of file data in the first storage area is recovered by using the backup data in the second storage area,
the first processor replaces the plurality of file data in the first storage area with the backup data in the second storage area, and, for each of the plurality of file data included in the backup data, compares the first time with the third time, extracts file data for which the third time is newer than the first time from the plurality of file data, and deletes a stub which corresponds to the extracted file data and which is stored in the first storage area.

6. A method of operating a storage system that includes: a first storage apparatus, which is coupled to a client computer and includes a first storage area storing a plurality of file data which are access targets of the client computer, and a second storage area storing backup data of the plurality of file data; and a second storage apparatus, which is coupled to the first storage apparatus, and includes a third storage area storing the file data migrated from the first storage area,
the method comprising:
when backup of the plurality of file data from the first storage area to the second storage area is executed, creating copy data of the plurality of file data as backup data and storing the backup data in the second storage area, and managing a first time at which the backup data is created;
when one or more file data included in the plurality of file data is selected and migrated from the first storage area to the third storage area, creating a stub indicating a storage location for each of the migrated file data in the third storage area, storing the stub in place of the migrated file data in the first storage area, storing the migrated file data the third storage area, and managing a second time at which each of the migrated file data is migrated; and
when the plurality of file data in the first storage area is recovered using the backup data in the second storage area, replacing the plurality of file data in the first storage area with the backup data in the second storage area, comparing the first time with the second time for each of the migrated file data stored in the third storage area, and extracting file data for which the second time is newer than the first time from the migrated file data, and restoring a stub indicating a storage location in the third storage area of the extracted file data, and storing the stub in the first storage area.

7. The storage system operating method according to claim 6, further comprising:
after first file data of the plurality of file data is migrated from the first storage area to the third storage area,
in cases where access to the first file data of the plurality of file data is received from the client computer, judging whether or not the first file data is file data replaced with a stub; and
in cases where the first file data is file data replaced with a stub, specifying a storage, location in the third storage area of the first file data, according to information of the stub, and supplying the first file data stored in the third storage area to the client computer.

8. The storage system operating method according to claim 7, wherein
the second storage apparatus is a storage apparatus of a lower performance or a higher capacity than the first storage apparatus,
the method further comprising:
migrating file data for which a fixed period has elapsed since the last update time, of the plurality of file data stored in the first storage area, from the first storage area to the third storage area.

9. The storage system operating method according to claim 8, wherein
the stub stored in the first storage area of the first storage apparatus exists for each file data migrated from the first storage area to the third storage area, and is information which includes an identifier for each file data migration, a migration time, and a storage location in the third storage area of the file data,
the method further comprising:
sending, from the second storage apparatus to the first storage apparatus, information relating to the identifier, the migration time, and the storage location in the third storage area of the file data, the sent information corresponding to file data which is extracted from the migrated file data and for which the second time is newer than the first time; and
restoring a stub for the extracted file data on the basis of information sent from the second storage apparatus to the first storage apparatus, and storing the stub in the first storage area.

10. The storage system operating method according to claim 6, further comprising:
in cases where one or more file data of a plurality of migrated file data stored in the third storage area is deleted, performing control to manage a deletion time of the deleted file data as a third time, and to delete a stub which corresponds to the deleted file data and which is stored in the first storage area; and
when a fault occurs in the first storage area, and the plurality of file data of the first storage area is recovered by using the backup data in the second storage area, replacing the plurality of file data in the first storage area with the backup data in the second storage area, and, for each of the plurality of file data included in the backup data, comparing the first time with the third time, extracting, from the plurality of file data, file data for which the third time is newer than the first time, and deleting a stub which corresponds to the extracted file data and which is stored in the first storage area.

* * * * *